United States Patent
Bollati et al.

(10) Patent No.: US 8,031,579 B2
(45) Date of Patent: Oct. 4, 2011

(54) READ/WRITE TRANSDUCER FOR A FERROELECTRIC STORAGE MEDIUM, AND CORRESPONDING STORAGE DEVICE AND METHOD

(75) Inventors: Giacomino Bollati, Castel San Giovanni (IT); Alessandro Bosi, Gadesco Pieve Delmona (IT); Giovanni Antonio Cesura, Cremona (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 291 days.

(21) Appl. No.: 12/199,207

(22) Filed: Aug. 27, 2008

(65) Prior Publication Data
US 2008/0316906 A1 Dec. 25, 2008

Related U.S. Application Data

(63) Continuation-in-part of application No. PCT/IT2006/000114, filed on Feb. 27, 2006.

(51) Int. Cl.
*G11B 9/00* (2006.01)
(52) U.S. Cl. ....................................... 369/126
(58) Field of Classification Search .................. 369/126, 369/100, 47.28, 47.32; 360/53, 62–64
See application file for complete search history.

(56) References Cited

U.S. PATENT DOCUMENTS

| | | | |
|---|---|---|---|
| 5,179,533 A | 1/1993 | Bullington et al. | |
| 6,477,132 B1 | 11/2002 | Azuma et al. | |
| 6,515,957 B1 | 2/2003 | Newns et al. | |
| 7,397,624 B2 * | 7/2008 | Johns et al. | 360/75 |
| 7,447,140 B2 * | 11/2008 | Lutwyche et al. | 369/126 |
| 2005/0013230 A1 * | 1/2005 | Adelmann | 369/126 |
| 2005/0128616 A1 | 6/2005 | Johns et al. | |
| 2005/0152249 A1 * | 7/2005 | Fukunaga et al. | 369/53.2 |
| 2006/0245312 A1 * | 11/2006 | Maeda et al. | 369/44.11 |
| 2009/0095705 A1 | 4/2009 | Riva et al. | |

* cited by examiner

*Primary Examiner* — Thang Tran
(74) *Attorney, Agent, or Firm* — Lisa K. Jorgenson; E. Russell Tarleton; Seed IP Law Group PLLC

(57) ABSTRACT

A transducer for a storage medium has a supporting element positioned over the storage medium with a first head configured to interact with the storage medium and a second head operatively connected to the first head to interact with the storage medium. The second head is carried by the supporting element in a position adjacent to the first head, and the first head and the second head are aligned in a scanning direction. The first head performs the reading of a data item stored in a portion of the storage medium, the reading entailing the deletion of the data item, and the second head performs the rewriting of the data item in the same portion of the storage medium.

16 Claims, 2 Drawing Sheets

READ/WRITE TRANSDUCER FOR A FERROELECTRIC STORAGE MEDIUM, AND CORRESPONDING STORAGE DEVICE AND METHOD

BACKGROUND

1. Technical Field

The present disclosure concerns a read/write transducer for a storage medium, in particular of a ferroelectric material, and an associated storage device and method, in particular for "probe storage" applications, to which the following description will make explicit reference without this implying any loss of generality.

2. Description of the Related Art

As is known, storage systems using a technology based on magnetism, such as hard disks, suffer from severe limitations regarding increases in data storage capacity and read/write speed, and size reduction. In particular, there is a physical limit, the so-called "superparamagnetic limit," which prevents the reduction in size of magnetic storage domains under a critical threshold, below which the stored information can be lost.

Alternative storage systems have thus been proposed in recent years, amongst which the so-called "probe storage" systems (also known as "atomic storage" systems) have assumed particular significance. These systems allow high data storage capacity to be achieved with reduced size and low manufacturing costs. In brief, these storage systems comprise a two-dimensional array of transducers (or probes), each provided with a respective read/write head, located above a storage medium and movable with respect to the storage medium. Each transducer is configured to locally interact with a portion of the storage medium (corresponding to a memory track), for reading/writing individual bits of information ("1" or "0").

In particular, in known storage systems of the "probe storage" type using a storage medium of ferroelectric material, the reading/writing of the individual bits is carried out by interacting with the ferroelectric domains of the ferroelectric material.

As is known, a ferroelectric material has a spontaneous polarization, which can be inverted by an applied electric field; furthermore, as shown in FIG. 1, this material has a hysteresis cycle. When a positive voltage V greater than a positive threshold $V_{th}$ is applied to the medium of ferroelectric material, a positive charge Q is stored in the material; conversely, a negative charge −Q is stored in the material when the applied voltage drops below a negative threshold $-V_{th}$. Any intermediate voltage value between the negative and positive thresholds does not cause any change in the stored charge.

In detail, during the write operation, the ferroelectric storage medium is polarized at a reference potential (e.g., ground). Then, a write voltage $V_s$ (FIG. 2a) having a substantially square waveform between a maximum positive value $V_{max}$, higher than the positive threshold $V_{th}$, and a minimum negative value $V_{min}$, lower than the negative threshold $-V_{th}$, is applied to a write head that moves above the medium. In this way, a charge sequence $Q_i$ is stored inside the storage medium, the polarity of which substantially replicates the polarity of the applied write voltage $V_s$ (FIG. 2b). In particular, for each specified interval $T_{bit}$ of this square waveform, there is the corresponding polarization of a ferroelectric domain located along a memory track, and consequently a memory cell having a high ("1") or low ("0") binary value according to the polarity of the stored charge.

During the read operation of previously stored information, a read head moves above the ferroelectric storage medium along the track, in contact with the ferroelectric material. The read head is polarized, for example, with a voltage greater than the positive threshold $V_{th}$. When the read head is over a domain with a negative charge, it causes the polarity inversion of the stored charge. This inversion implies an exchange of charge between the read head and the storage medium and the presence of a current I emitted by the head (FIG. 2c). The value of the current I depends on the quantity of charge stored in the cell (in turn dependent on the type of ferroelectric material) and is directly proportional to the head scanning speed. Conversely, when the read head is over a domain with a positive charge, the head does not exchange charges with the medium and therefore no appreciable current flows through the head. The read operations can therefore be carried out by a suitable circuit configured to detect the current (particularly the presence or absence of an appreciable amount of current) flowing between the read head and the storage medium. In an altogether similar manner, a polarization voltage lower than the negative threshold $-V_{th}$ can be applied to the read head, such as to cause polarity inversion in the domains with a positive charge.

The main problem of this read/write scheme is tied to the fact that the read operations are destructive, i.e., they entail the removal of the stored information and therefore the impossibility of making a subsequent reading of the same data. In fact, the reading of a portion of the memory (or track) corresponds to the writing of a sequence of charges that are all positive (or all negative, if a negative polarization voltage is used for the read head) in that portion of memory. Consequently, during reading the flow of read data must be stored in a memory buffer, the dimensions of which must be at least equal to the size of the track read. Furthermore, the contents of the memory buffer must be successively rewritten to the previously read track, so that the head must be repositioned at the start of the track, must rewrite the entire track and only afterwards can it undertake a new read operation. Thus, not only is the presence of a memory buffer of large dimensions necessary, but the rate of transferring data (data rate) is greatly limited as well, in particular being at least halved (as every read operation entails a successive write operation).

BRIEF SUMMARY

The present disclosure provides a ferroelectric storage device that allows the previously mentioned problems and drawbacks to be overcome.

According to one embodiment of the present disclosure a transducer for a storage medium and a storage device is provided that includes a supporting element positioned in use over said storage medium and a first head carried by said supporting element and configured to interact with said storage medium and a second head operatively connected to said first head to interact with said storage medium.

According to a further embodiment, the present disclosure, a method for operating a storage device is also provided, the method including performing a read of a data item stored in a portion of said storage medium via said first head, said read entailing the deletion of said data item, and performing a rewrite of said data item in said portion of said storage medium via a second head in the transducer.

In accordance with another embodiment of the present disclosure, a memory device is provided that includes a storage medium formed of ferroelectric material and comprising at least one track adapted to store a sequence of voltage values; and a read/write transducer assembly comprising at least one transducer having a first head adapted to read voltage values from the storage medium and a second head mounted adjacent the first head and separated from the first head by a distance d to write the read voltage values back to the same location on the storage medium from which they were read by the first head.

In accordance with another aspect of the foregoing embodiment, the memory device includes a control circuit coupled to the transducer assembly and the storage medium, the control circuit adapted to control relative movement of the storage medium and the transducer assembly and selectively position the at least one transducer over the at least one track.

In accordance with another aspect of the foregoing embodiment, the first and second heads are carried on a supporting element and in alignment with the at least one track so that the second head writes a voltage value to one location on the at least one track while the first head is simultaneously reading a voltage value from another location in the at least one track.

BRIEF DESCRIPTION OF THE SEVERAL VIEWS OF THE DRAWINGS

For a better understanding of the present disclosure, preferred embodiments will now be described, purely by way of non-limitative example and with reference to the attached drawings, wherein.

DETAILED DESCRIPTION

An aspect of the present disclosure envisages associating two heads with a read/write transducer of a storage device, which move in line over a same portion of a associated ferroelectric storage medium (in particular, along a same track). A first head is a read head that reads the data stored in a given position and consequently deletes it (see previous description), while a second head is a write head, which follows the read head, and which restores and rewrites the previously deleted data to the same position from which it was read.

Figure 1:
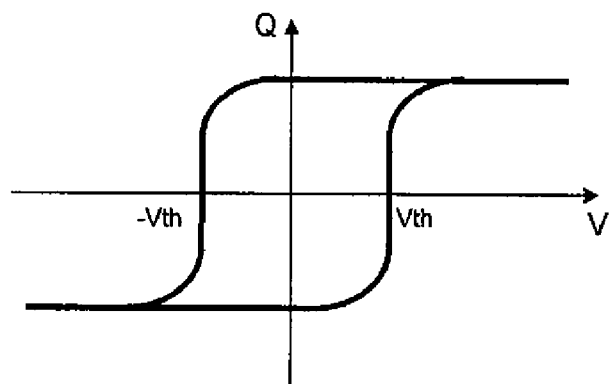
FIG. 1 shows a known hysteresis cycle associated with a ferroelectric material of a storage medium.
Figure 2A:
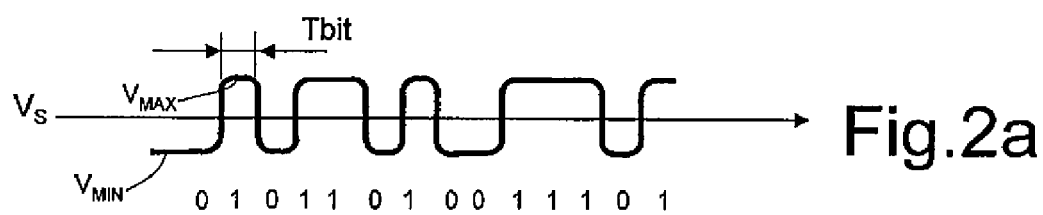
FIGS. 2a-2c show waveforms of electrical quantities associated with the read and write operations of a ferroelectric storage medium.
Figure 2B:
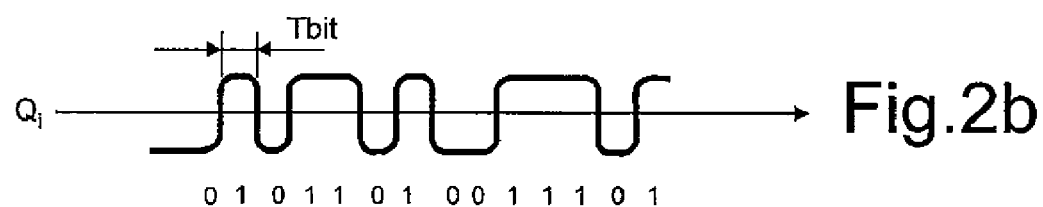
Figure 2C:
Figure 3:
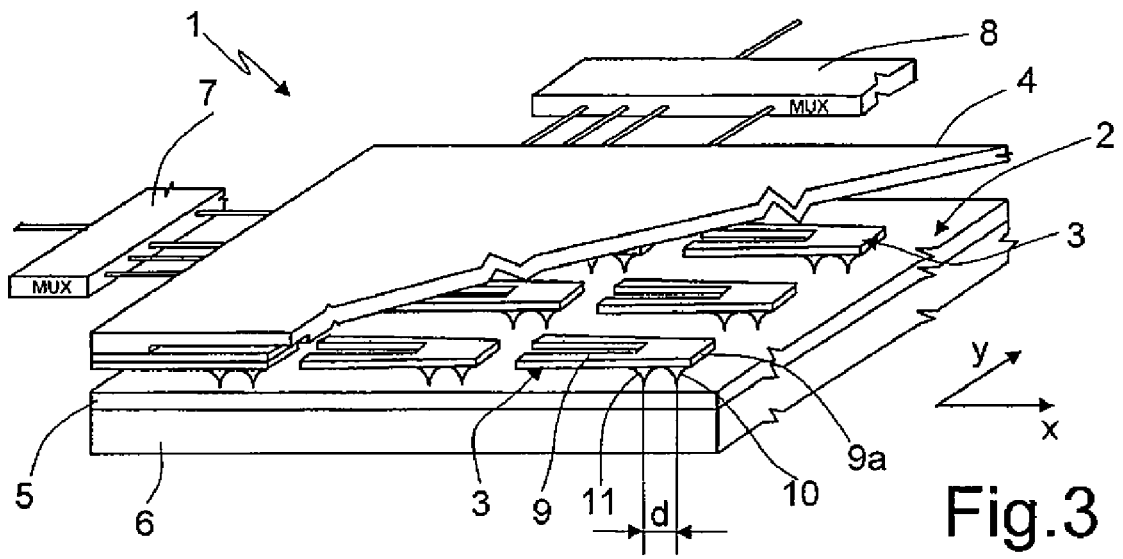
FIG. 3 is a schematic, perspective representation with a partial cutaway of a ferroelectric storage device according to an aspect of the present disclosure, FIGS. 4a-4c schematically show the successive phases of a read operation on a given stored data item and an associated rewrite operation of the previously deleted data item.

In detail, and with reference to FIG. 3, a storage device 1 includes a two-dimensional array 2 of read/write transducers 3 fixed to a common substrate 4, of silicon for example, and suspended above a storage medium 5, in particular made of a ferroelectric material film, for example PZT—lead zirconate titanate (or other suitable ferroelectric material). The storage medium 5 is positioned on a mobile platform 6 moved in one or more directions via an actuating system, including microactuators for example. Each read/write transducer 3 can be controlled in reading or writing via an addressing technique similar to that commonly used in DRAM memories, and therefore via two multiplexers 7 and 8, respectively, selecting the rows and columns of the two-dimensional array 2. The transducers 3 have relative movement with respect to the storage medium 5 in a first and second direction (x and y) that are mutually orthogonal.

The storage medium 5 is divided into a plurality of regions (of generically rectangular shape, for example), in turn subdivided into tracks, each of which is associated with a respective read/write transducer 3. In a known manner, the polarization of the ferroelectric domains that follow one another along the various tracks determines the value of the binary data stored in the tracks (each domain constituting a memory cell). For example, the individual tracks are composed of memory cells aligned along a first direction x, and the individual ferroelectric domains have a generically rectangular shape with the shorter side (15 nm long, for example) in the first direction x, and the longer side (50 nm long, for example) in the second direction y. Memory cells belonging to the same track are therefore spaced 15 nm apart in the first direction x, while successive tracks are spaced 50 n apart in the second direction y.

In greater detail, each read/write transducer 3 includes a supporting element 9 (commonly defined as a cantilever), cantilever-suspended above the storage medium 5; for example, the supporting element 9 is composed of silicon and formed by exploiting micro-manufacturing techniques that allow its definition and release from the substrate 4. According to a particular aspect of the present disclosure, each supporting element 9 carries a pair of heads 10, 11 near one of its free ends 9a: in particular, a read head 10, arranged in a distal position with respect to the supporting element 9, and a write head 11, arranged in a proximal position with respect to the supporting element 9. In the case in which the scanning movement of the read/write transducers 3 takes place in the first direction x from left to right (in the direction of the arrow in the figure), the write head 11 comes before the read head 10 in the first direction x, so as to follow the same read head 10 during the scanning movement. In particular, the write head 11 is located in a position adjacent to the read head 10, is aligned with it in the first direction x, and is separated from the read head 10 by a separation distance d. The read head 10 and the write head 11 comprise a metallic material, preferably of high conductivity, for example Cu, Ti, W, or Ni, possibly with a lateral coating of dielectric material, for example $SiO_2$.

Figure 4A:
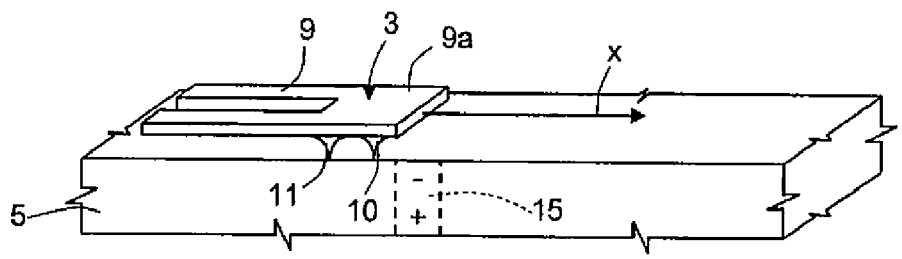
Figure 4B:
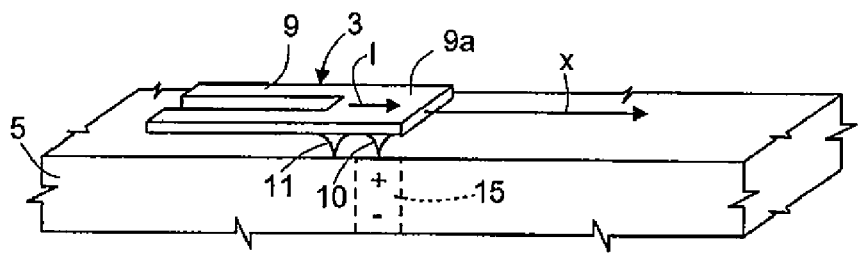
Figure 4C:
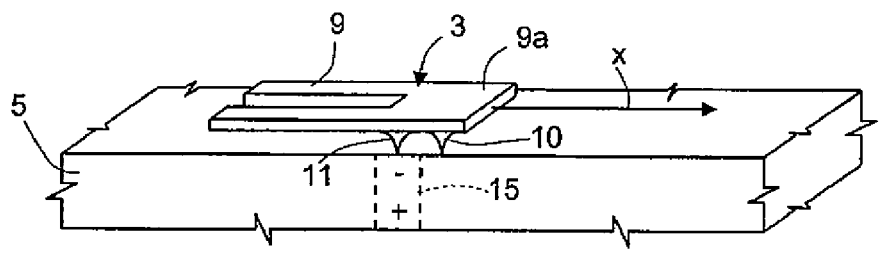
Figure 5:
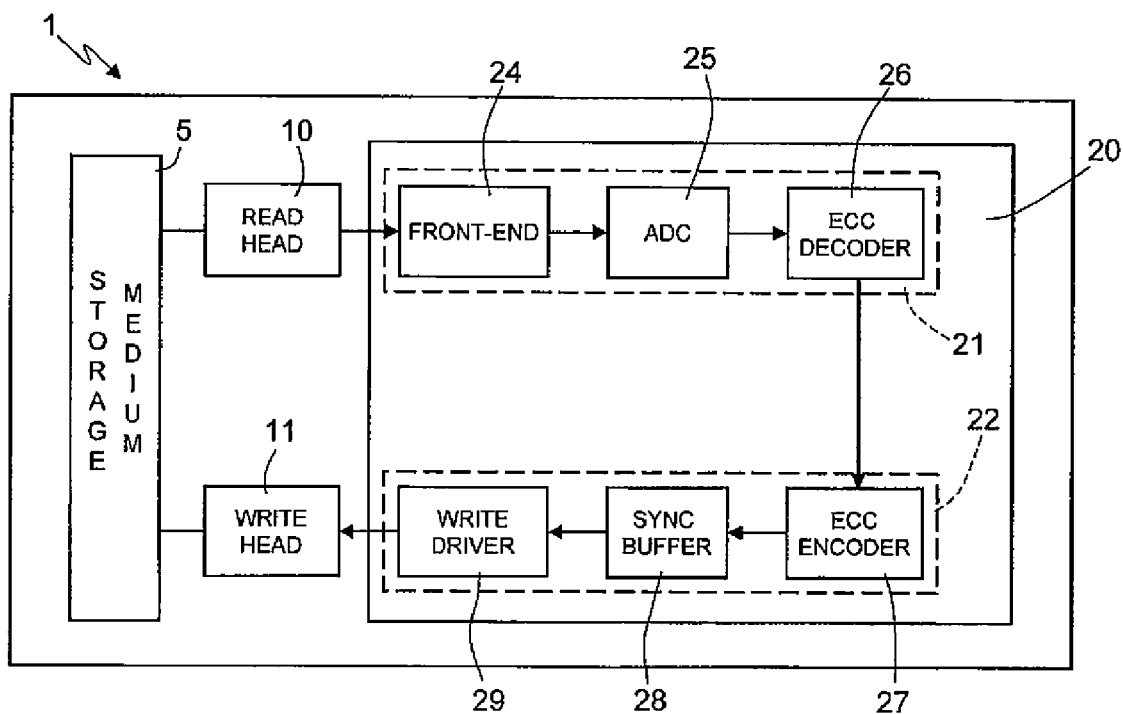
FIG. 5 is a block diagram of a read/write circuit for the storage device in FIG. 3.

In use (FIG. 4a), the storage medium 5 is moved with respect to the two-dimensional array 2 so that the read/write transducers 3 assume a movement relative to this medium 5 in the first direction x (in the direction indicated by the arrow), and the write head 11 follows the read head 10 in this movement. A read stage (described in detail in the following with reference to FIG. 5) of storage device 1 polarizes the read head 10 to a predetermined reading potential $V_r$, for example a positive potential greater than a positive hysteresis threshold of the ferroelectric material. As previously described, when the read head 10 moves over a storage domain 15 with the opposite polarization (negative in this case), it causes polarization inversion (FIG. 4b). The consequence of this inversion of polarization is a current I flowing between the read head 10 and the storage medium 5, which is detected in real time (i.e., with marginal delays depending exclusively on the electronics) by the read stage (which acquires a relevant read signal), possibly subjected to suitable processing, and then sent to a write stage of the storage device 1, electrically coupled to the write head 11. Successively (FIG. 4c), when the write head 11 is located over the previously read and deleted storage domain 15, it is appropriately driven by a write signal generated by the write stage, so as to restore the polarization of the storage domain 15, and thus rewrite the read data item in the same position it previously occupied.

To ensure that the data item is effectively rewritten in the same position, the separation distance d between the read head 10 and the write head 11 cannot be chosen in an arbitrary manner, but must be opportunely chosen as a function of the read/write circuit total processing time $t_{tot}$ (also known as latency time, i.e., the time necessary to detect the read signal, process it and then prepare the circuit for rewriting the data item) and the speed $v_r$ of the relative movement of the write head 11 with respect to the storage medium 5. For example, if the latency time and the speed of the write head 11 are set, the separation distance is determined by the following relation: $d \geq v_r \cdot t_{tot}$.

From what has been described, a particular feature of the present disclosure is clear: the rewriting of a data item in a track that is subjected to a read operation is carried out while the reading of a successive data item in the same track is in course and, in particular, each data item which is read (and deleted) by the read head 10 is afterwards restored by the write head 11 in the same position previously occupied in the storage medium 5. Accordingly, once the reading of a track ends, the same track has already been rewritten by the additional write head, with the obvious advantage of attaining a data rate that is at least doubled with respect to traditional storage devices.

In detail (see FIG. 5), the storage device 1 is provided with a read/write circuit 20 having a read stage 21 connected to the read head 10, and a write stage 22 connected to the read stage 21 and to the write head 11.

The read stage 21 includes an analog front-end 24 connected to the read head 10 and configured to detect and amplify the current flow on the head and to convert it into a voltage signal, an analogue-to-digital converter (ADC) 25 connected to the output of the analog front-end 24 and configured to sample this voltage signal and convert it into a digital signal, and an error correction code (ECC) decoder 26 of a known type, for example using a Reed-Solomon code or BCH code, and connected to the output of the analogue-to-digital converter 25.

The output signal from the error correction code decoder 26 is then sent to the write stage 22, which includes an ECC encoder 27 using a code complementary to the previously used code, a synchronization buffer 28 connected to the output of the ECC encoder 27, and a write driver 29 connected to the output of the synchronization buffer 28 and configured to generate a write signal for driving the write head 11.

In particular, the synchronization buffer 28 stores a small number of bits and has the function of ensuring the correct synchronization of the write operations, so that the read data is effectively rewritten in the same, previously occupied position in the storage medium 5. The presence of this synchronization buffer 28 is required in the case where, for safety reasons, the separation distance d is chosen to be greater than the previously indicated expression; therefore the write head 11 is positioned over the particular storage domain 15 at which the previously read data item must be written with a certain delay with respect to the completion of the read signal processing operations. In this case, the synchronization buffer 28 conveniently allows this delay to be taken into account and to compensate for it.

The advantages of the storage device according to the disclosure are clear from the foregoing description.

In any case, the fact that the presence of two heads associated with the read/write transducer allows not having virtually any delays in rewriting the track that is deleted due to the read operations should again be emphasized. Accordingly, the data rate is at least doubled with respect to traditional storage devices.

In addition, the presence of a large data retention buffer for storing the entire track is not necessary; a small synchronization buffer is used in the event that, under certain operating conditions, the synchronization of data rewrite operations has to be assured.

Finally, it is clear that modifications and variations can be made to what is described and illustrated herein without however departing from the scope the present disclosure, as defined in the attached claims.

In particular, the position of the read and write heads can be inverted if the read scan is carried out in the opposite direction to the first direction x (i.e., from right to left).

In addition, the read/write circuit 20 can be usefully configured to invert the function of each head each time that the reading of a track is completed. Once arrived at the end of the track, the read head 10 could be connected (for example, via a suitable switching circuit, not shown) to the write stage 22 (thus assuming the function of write head), and the write head 11 to the read stage 21 (thus assuming the function of read head). In this way, it is possible to undertake the reading of a new track (in particular, in the opposite direction to that of the previous read scan) without it being necessary to reposition the read head. This variant allows the data transfer rate of the storage device to be increased even further.

The various embodiments described above can be combined to provide further embodiments. In addition, it is to be understood that either one or both of the transducer and the storage medium may be moved relative to one another in order to position the read and write heads over desired locations of the medium. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transducer for a storage medium, comprising: a supporting element positioned in use over the storage medium and a first head carried by the supporting element and a second head carried by the supporting element in a position adjacent to the first head, the first head structured to interact with the storage medium to read data stored in a portion of the storage medium, the second head structured to rewrite the read data to the same portion of the storage medium while the first head is reading a successive data item from a subsequent portion in a same track in the storage medium, the second head positioned a distance d from the first head where the distance d has the following relation:

$$d \geq v_r \cdot t_{tot}$$

where $v_r$ is the speed of the relative movement between the second head and the storage medium and $t_{tot}$ is a total processing time to detect a read signal, process the read signal, and prepare to rewrite the data.

2. The transducer of claim 1 wherein the transducer is configured to move along a scanning direction at a scanning speed with respect to the storage medium, the first head and the second head aligned in the scanning direction and separated by a separation distance that is a function of the scanning speed.

3. The transducer of claim 2 wherein said second head comes before said first head in said scanning direction.

4. A storage device, comprising: a storage medium and a transducer associated with the storage medium, the transducer provided with a supporting element positioned over the storage medium and a first head carried by the supporting element and configured to interact with the storage medium, and a second head operatively connected to the first head to interact with the storage medium;
a read/write circuit couple to the first and second head and structured to communicate with the first head to read a data item stored in a portion of the storage medium, and to communicate with the second head to rewrite the data item in the portion of the storage medium; and
an actuator structured to move the transducer with respect to the storage medium in a first scanning direction with a scanning speed, the read/write circuit structured to detect a read signal during the reading of the data item by the first head, process the read signal in real time, and generate a write signal for driving the second head in the rewriting of the data item, and wherein the first head and the second head are aligned in the first scanning direction and are separated by a separating distance that is a function of the scanning speed and a latency time wherein the latency time is a total processing time to detect the read signal, process the read signal, and prepare to rewrite the data.

5. The device of claim 4 wherein said second head is carried by said supporting element in a position adjacent to said first head.

6. The device of claim 4 wherein the rewriting takes place substantially simultaneously with the reading of a subsequent data item stored in the storage medium by the first head.

7. The device of claim 4 wherein the second head comes before the first head in the first scanning direction.

8. The device of claim 4 wherein the read/write circuit comprises a read stage coupled to the first head and structured to detect and process the read signal, and a write stage coupled to the read stage and to the second head and structured to receive the processed read signal and generate the writing signal, the write stage including a synchronization buffer structured to ensure the synchronization of the rewrite, and the writing of the data item in said portion of the storage medium.

9. The device of claim 4 wherein the actuator is structured to move the transducer with respect to the storage medium in a second scanning direction opposite the first scanning direction, the read/write circuit in the second scanning direction structured to cooperate with the second head for reading the storage medium, and to cooperate with the first head for rewriting the storage medium.

10. The device of claim 4 wherein said storage medium comprises a ferroelectric material, and said reading and rewriting entail changing the polarizations of ferroelectric domains of said ferroelectric material.

11. A method for operating a storage device provided with a storage medium and a transducer associated with said storage medium and having a first head and a second head having a separation distance from the first head that is a function of a scanning speed and a processing latency time, comprising:
performing a read of a data item stored in a portion of the storage medium via the first head, the read entailing a deletion of the data item, and performing a rewrite of the data item in the portion of the storage medium via a second head in the transducer simultaneously with the reading of a subsequent data item stored in the storage medium via the first head wherein the first and second heads are moved in a scanning direction with the scanning speed and wherein the processing latency time is a total processing time to detect the read data item, process the read data item, and prepare to rewrite the data.

12. The method of claim 11 wherein the step of performing a read comprises detecting a read signal and the step of performing a rewrite comprises processing the read signal in real time and generating a write signal for driving the second head in the rewriting of the data item, the step of processing comprising storing the read signal in a synchronization buffer for ensuring the synchronization of the rewriting, and the writing of said data item in the portion of the storage medium.

13. The method of claim 11, further comprising moving said transducer with respect to said storage medium in a first scanning direction, said step of performing a read comprising positioning said first head over said portion and reading said data item via said first head, and said step of performing a rewrite comprising positioning said second head over said portion and writing said data item via said second head.

14. A memory device, comprising:
a storage medium formed of ferroelectric material and comprising at least one track adapted to store a sequence of voltage values; and
a read/write transducer assembly comprising at least one transducer having a first head structured to read voltage values from locations on the storage medium and a second head mounted adjacent the first head and separated from the first head by a distance d that is a function of a scanning speed and processing latency time, the second head structured to write the read voltage values back to the same locations on the storage medium from which they were read by the first head, wherein the first and second heads are moved in a scanning direction with the scanning speed, and wherein the processing latency time is a total processing time to detect the read voltage value, process the read voltage value, and prepare to rewrite the read voltage value.

15. The device of claim 14, comprising a control circuit coupled to the transducer assembly and the storage medium, the control circuit adapted to control relative movement of the storage medium and the transducer assembly and selectively position the at least one transducer over the at least one track.

16. The device of claim 15 wherein the first and second heads are carried on a supporting element and in alignment with the at least one track so that the second head writes a voltage value to one location on the at least one track while the first head is simultaneously reading a voltage value from another location in the at least one track.

* * * * *